United States Patent
Rasmus et al.

(10) Patent No.: US 10,451,769 B2
(45) Date of Patent: Oct. 22, 2019

(54) METHOD FOR DETERMINING PETROPHYSICAL PROPERTIES FROM LOGGING MEASUREMENTS

(71) Applicant: Schlumberger Technology Corporation, Sugar Land, TX (US)

(72) Inventors: John C. Rasmus, Richmond, TX (US); Christopher E. Morriss, Sugar Land, TX (US); Koji Ito, Sugar Land, TX (US); Hui Xie, Katy, TX (US); Roger Griffiths, Selangor (MY); Shahzad A. Asif, Richmond, TX (US); David Maggs, Somerset (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 173 days.

(21) Appl. No.: 15/005,666

(22) Filed: Jan. 25, 2016

(65) Prior Publication Data
US 2016/0216405 A1   Jul. 28, 2016

Related U.S. Application Data

(60) Provisional application No. 62/107,899, filed on Jan. 26, 2015.

(51) Int. Cl.
   *G01V 11/00* (2006.01)
(52) U.S. Cl.
   CPC .................. *G01V 11/00* (2013.01)
(58) Field of Classification Search
   CPC .................................................. G01V 11/00
   See application file for complete search history.

(56) References Cited

U.S. PATENT DOCUMENTS

2010/0312478 A1   12/2010   Tabanou et al.
2012/0325556 A1   12/2012   Luxey
(Continued)

FOREIGN PATENT DOCUMENTS

WO   WO2013066682 A1   5/2013

OTHER PUBLICATIONS

International Search Report issued in related PCT application PCT/US2016/014812 dated May 12, 2016, 3 pages.
(Continued)

*Primary Examiner* — Mamadou L Diallo

(57) ABSTRACT

A method for transforming a 2D or 3D earth volume geometry into a 1D earth volume geometry includes performing a measurement using the measurement sensor in a wellbore. A layer boundary in the 2D or 3D earth volume geometry that is nearest to the measurement sensor is identified. A vector from the measurement sensor is generated toward the nearest layer boundary. A first intersection is identified between the vector and the nearest layer boundary, and a second intersection is identified between the vector and another layer boundary. Simulated boundaries that extend through the first and second intersections and are perpendicular to the vector are generated. The 1D earth volume geometry that is bounded by the first and second intersections is identified. A property value is extracted from the 2D or 3D earth volume geometry between the first and second intersections. The property value is assigned to the 1D earth geometry.

20 Claims, 13 Drawing Sheets

(56) References Cited

U.S. PATENT DOCUMENTS

| | | |
|---|---|---|
| 2013/0144571 A1 | 6/2013 | Pepper et al. |
| 2013/0332125 A1 | 12/2013 | Suter et al. |
| 2014/0149040 A1 | 5/2014 | Omeragic et al. |
| 2016/0160629 A1* | 6/2016 | Donderici ............ E21B 47/0006 324/238 |
| 2016/0252648 A1 | 9/2016 | Omeragic et al. |
| 2017/0010377 A1* | 1/2017 | Terentev .................. G01V 3/30 |
| 2017/0191361 A1* | 7/2017 | Khalaj Amineh .. E21B 47/0002 |

OTHER PUBLICATIONS

Griffiths, Roger et al, "Formation Evaluation in High Angle and Horizontal Wells—A New and Practical Workflow", Society of Petrophysicists and Well Log Analysts, SPWLA 53rd, Jun. 16-20, 2012, 16 pages.

Xie, Hui et al., "Improved Consistency of Inversion-Based Interpretation of LWD Density Images in Complex Horizonta WEII Scenarios", Society of Petrophysicists and Well Log Analysts, SPWLA 55th, May 18-22, 2014, 19 pages.

* cited by examiner

METHOD FOR DETERMINING PETROPHYSICAL PROPERTIES FROM LOGGING MEASUREMENTS

CROSS-REFERENCE TO RELATED APPLICATION

This application claims priority to U.S. Provisional Patent Application having Ser. No. 62/107,899, filed on Jan. 26, 2015. The entirety of this priority provisional patent application is incorporated by reference herein.

BACKGROUND

Logging tools have long been used in wellbores to make, for example, formation evaluation measurements to infer properties of the formations surrounding the wellbore and the fluids in the formations. Common logging tools include electromagnetic (resistivity) tools, nuclear tools, acoustic tools, and nuclear magnetic resonance (NMR) tools, though various other types of tools for evaluating formation properties are also available.

Early logging tools were run into a wellbore on a wireline cable after the wellbore had been drilled. Modern versions of such wireline tools are still used extensively. However, as the demand for information while drilling a wellbore continued to increase, measurement-while-drilling (MWD) tools and logging-while-drilling (LWD) tools have since been developed. MWD tools provide drilling parameter information such as weight on the bit, torque, temperature, pressure, direction, and inclination. LWD tools provide formation evaluation measurements such as resistivity, porosity, NMR distributions, and so forth. MWD and LWD tools often have characteristics common to wireline tools (e.g., transmitting and receiving antennas, sensors, etc.), but MWD and LWD tools are designed and constructed to endure and operate in the harsh environment of drilling.

The use of electromagnetic measurements in previous downhole applications, such as LWD and wireline logging applications is well known. Such techniques may be utilized to determine a subterranean formation resistivity, which, along with formation porosity measurements, is often used to indicate the presence of hydrocarbons in the formation. Moreover, azimuthally-sensitive directional resistivity measurements are employed (e.g., in pay-zone steering applications) to provide information upon which steering decisions may be made.

Downhole electromagnetic measurements may be inverted using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently much more complex than the formation models used in the inversion. The use of full tensor propagation measurements may enable a full tensor measurement of the formation properties to be obtained. However, finding reliable techniques for providing an accurate gain compensated full tensor measurement has been a challenge for the industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A computing system, a method, and a non-transitory computer-readable medium for transforming a two-dimensional (2D) or three-dimensional (3D) earth volume geometry into a one-dimensional (1D) approximation for forward modeling or inversion are disclosed. The method, for example, includes running a measurement sensor into a wellbore in a subterranean formation and performing a measurement using the measurement sensor. A layer boundary in the 2D or 3D earth volume geometry that is nearest to the measurement sensor is identified. The nearest layer boundary is derived using, or consistent with, the measurement. A vector is generated from the measurement sensor toward the nearest layer boundary. A first intersection between the vector and the nearest layer boundary is identified, and a second intersection between the vector and another layer boundary is identified. Simulated boundaries that extend through the first and second intersections and are perpendicular to the vector are generated. The 1D earth volume geometry that is bounded by the first and second intersections is identified. Property values are extracted from the 2D or 3D earth volume geometry between the first and second intersections. The extracted property values are assigned to the 1D earth volume geometry.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
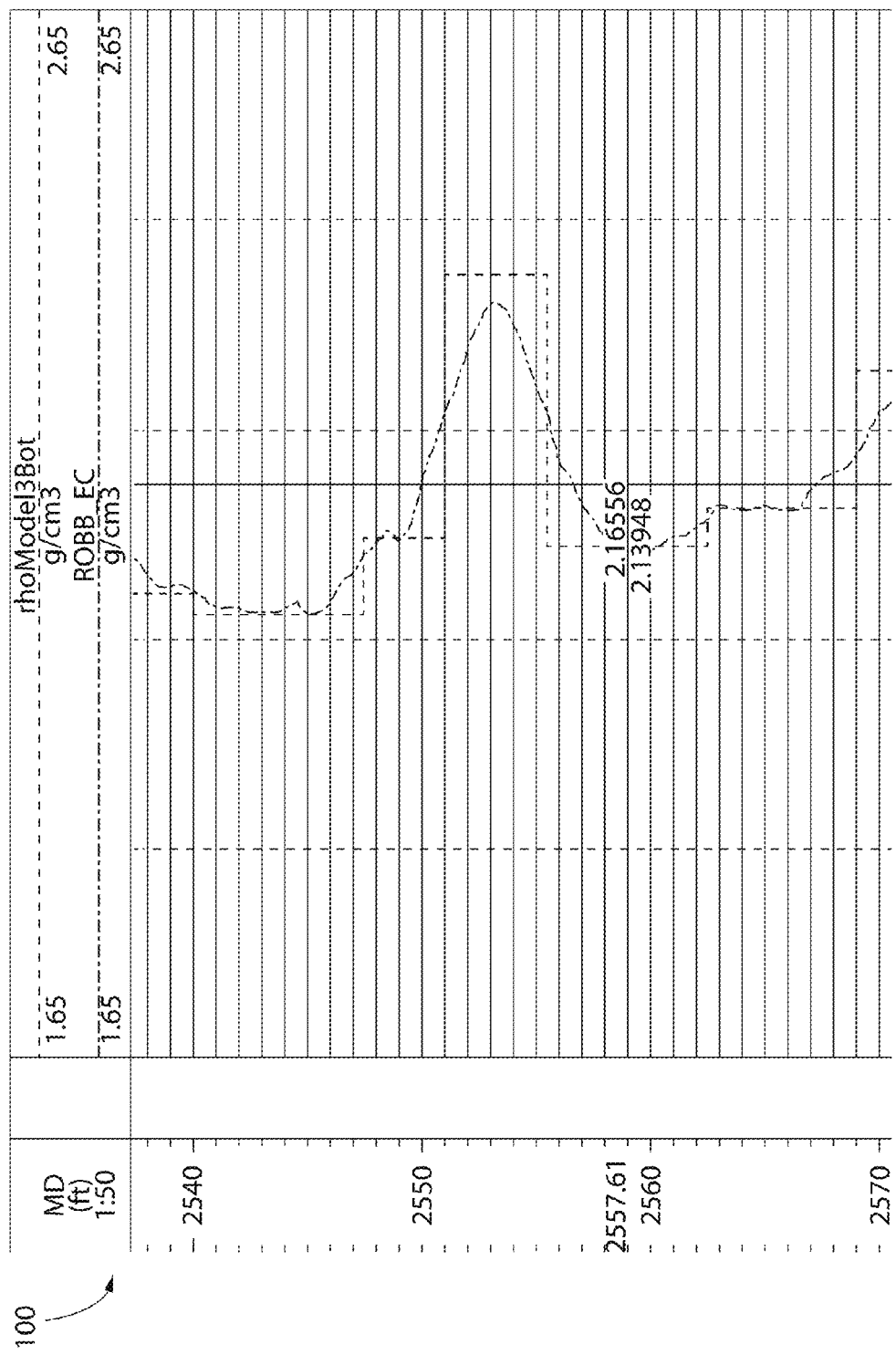
FIG. 1 depicts a well log of a well that penetrates a series of geological layers, according to an embodiment.

The accuracy of log interpretations may be improved by defining petrophysically and geologically relevant earth volumes that are intersected by a wellbore. An earth volume is defined as having constant petrophysical or log measurement properties such that a property boundary can be defined between adjacent volumes. Therefore, an earth volume is distinct from neighboring earth volumes. An earth volume may be represented in various simplified forms, one of which is a layered earth model.

Wellbore geophysical or "log" measurements represent a property of the formation. These measurements include, but are not limited to, natural gamma ray, resistivity, density, neutron porosity, velocity, nuclear magnetic resonance porosity, etc. The properties represented by these measurements may be determined for each earth volume using a model-compare-update workflow, by automatic inversions, or by a combination of the two. These properties may then be used for subsequent petrophysical evaluations (e.g., hydrocarbon volume, permeability, etc.). The properties of the earth volumes may then be used in property modeling and up-scaling workflows to perform more accurate reservoir flow simulations. Because of the increased accuracy, the resulting modeled reservoir flow simulations may result in a better match to actual reservoir volumes and flow rates.

Volumetric or simplified layered earth models may be relevant for well inclinations and relative formation dip, but are especially valuable for high-angle and horizontal (HaHz) wellbores where logging measurements are approximately parallel to the formation layers. The present disclosure allows a user to automatically and/or manually build an earth model that defines the boundaries and properties of the earth volume within the specific log measurement volume of investigation at any point along the wellbore trajectory.

The present disclosure also allows for the creation of earth volumes of differing scales that are appropriate for each measurement. For example, a larger volume may be defined for a deep penetrating electromagnetic measurement as compared to the volume defined for a nuclear measurement that measures a volume only a few inches from the wellbore.

The workflows and computations allow for the appropriate layer volume and boundary to be determined automatically from the measurements and then manually adjusted by the user. High resolution measurements are well suited for defining each boundary position and dip. Boundaries define the intersection of changes in the earth or formation properties as determined by that particular measurement after the measurement is modified for geometrical effects. The boundaries determined from each individual measurement may be consolidated such that one boundary is common between measurements, or they may remain as non-shared boundaries for inversions, forward modeling, and subsequent petrophysical computations.

As used herein, an earth volume in three dimensions is defined as a geometrical object having generally constant petrophysical or log measurement properties such that a property boundary may be defined between adjacent volumes. Earth volumes may be simplified as described below to facilitate forward modeling and inversions without large compromises in the accuracy of the determined properties in certain cases. These volumes are transected by a wellbore; however, when the wellbore trajectory is parallel to the earth volume boundaries, some of these volumes are not crossed, but are still within the measurement volume of investigation. These volumes are referred to as non-crossed volumes, layers, or boundaries.

The earth volume may have changing properties and boundary orientations in three dimensions (3D). As used herein, two dimensional "2DV" means an earth volume that is constrained to have generally constant properties in the direction orthogonal to the boundary orientation (normally defined as boundary dip and azimuth). Boundary orientations are not constrained. As used herein, two dimensional "2HD" means an earth volume that is constrained to have constant boundary orientations between volumes, but will have changing properties in the orientation parallel to the boundary orientation. As used herein, one dimensional with dip "1DD" means an earth volume that is constrained to have constant properties in the directional orthogonal to the boundary orientation as well as constant boundary orientations between volumes. As used herein, one dimensional "1D" means an earth volume that is constrained to have constant properties in the directional orthogonal to the boundary orientation as well as constant boundary orientations between volumes and these orientations are parallel to the earth's surface (i.e. horizontal). As used herein, zero dimensions "0D" means an earth volume that has constant properties in each dimension, and has no boundaries. As used herein, "MD" means measured depth along the wellbore trajectory. As used herein, "THL" means Total or True Horizontal Length or the cumulative measured depth along the trajectory when projected onto the horizontal plane in the earths reference frame. As used herein, "TVD" means True Vertical Depth or the depth of the trajectory when projected onto the vertical plane in the earths reference frame. This is also aligned with the gravity vector. As used herein, "TST" means True Stratigraphic Thickness or the thickness of a volume measured perpendicular to the boundary orientation. As used herein, "Curtain Section" means vertical cross-section view of the wellbore trajectory taken perpendicular to the trajectory at the measured depths. The Y axis is TVD, and the X axis is THL.

In one embodiment, a method may include determining an orientation or geometry of a volume boundary. This may include defining the geological boundary orientation in 1D, 2D (curtain section), or 3D space (e.g., including reservoir or seismic model with faults and pinchouts). The geological boundary orientation may be defined using the boundary location and orientation using multiple crossing events, background information (e.g., seismic) for low resolution measurements such as resistivity, and seismic for vertical high-angle and horizontal trajectories. An example may include representing a layer earth model geometry using a curtain section and/or user interaction.

The geological boundary orientation may also be defined near the wellbore boundary location for high resolution measurements such as nuclear for vertical, high-angle and horizontal trajectories. This may include log squaring for GR, density, other non-image data, manually-assigned dips, and the like. This may also include an autodip (e.g., dip, boundary location, log squaring, contouring for density and other measurements in MD for 3D geometries with 3D reference points) in the vicinity of the wellbore within the measurement DOI. An example may include representing a layer earth model geometry using a curtain section and/or user interaction.

The geological boundary orientation may also be defined using consolidation methods for boundaries. This may include snapping or imposing boundary positions.

The method may also include initializing earth volume log properties. This may include assigning volumes with constant log properties modified for geometrical effects (e.g., squared logs or measured logs).

The method may also include forward modeling of log measurements using the boundary positions, orientation, 1D, 2D, or 3D formation volumes. This may include using tool forward models such as ansibeds or FSFs. These may be 1D, 2D, or 3D.

The formation model may be adapted to forward model (e.g., by downscaling dimensions for performance). An example may include downscaling a 2D formation geometry to a series of local 1D models for input into a 1D forward model. Another example may include forward modeling using curtain section data. The layer properties may be verified by matching the forward model to measurements.

The method may also include determining earth volume properties using inversion techniques. This may include density inversion and/or multi-physics inversion techniques. This may also include propagating layers shallower and deeper than current MD to have a representation of non-crossed layers in adjacent windows for forward modeling and inversion of deeper reading measurements.

The method may also include utilizing MCU and inversion for volume log property determination(s). The method may also include computing petrophysical properties from forward-modeled or inversion-derived log properties. This may include determining reservoir volume properties such as saturation, pore volume, and permeability from constant log properties. Determining reservoir volume properties may be accomplished using individual formation volume or by individual reservoir cells. Determining reservoir volume properties may be accomplished using pseudo vertical wells, using MD, or using TVD. The properties may be computed within the inversion.

The method may also include using reservoir volume petrophysical properties in the reservoir model. This may include property modeling and/or upscaling.

Creating the Earth Model Geometry

A drilled wellbore penetrates a 3D earth volume of geological origins. This volume may be represented in two dimensions for simplicity or in three dimensions. Two dimensions may be appropriate in certain geological depositions such as marine depositions where gravity influences the sediments settling to the seafloor bottom. This may create a "layer-cake" geometry where the layers include reasonably similar minerals, and the dip of the boundary between layers does not change dramatically within the depth of investigation of wellbore geophysical measurements. Fluvial depositions may be better illustrated in three dimensions to describe the depositional volumes due to the larger influence of moving water at widely varying azimuths over short time intervals to deposit the sediments which can overcome the influence of gravity on the deposition. Regardless, the choice of dimensions used to represent the drilled earth volume may be determined from the seismic data, wellbore geophysical measurements, or existing reservoir descriptions.

FIG. 1 depicts a well log 100 penetrating a series of geological layers, according to an embodiment. More particularly, the well log 100 shows the measurement and "squared" approximation of layered properties. Due to the finite measurement resolution, the measured log may average the properties of several earth volumes at any one position on the log (i.e. one depth position). An algorithm that recognizes inflection points may be used to define the boundaries penetrated, resulting in the "squared" log shown.

Log squaring methods may provide layer boundary positions in measured depth space when the log response is symmetrical when crossing the boundary. Density measurements from LWD measurements may satisfy this condition, as determined by Monte Carlo N-Particle (MCNP) modeling. The axial measurement response function for other measurements may be determined by appropriate forward models. This response function may be used to determine the appropriate method for determining the earth volume boundaries when using other log measurements.

Figure 2:
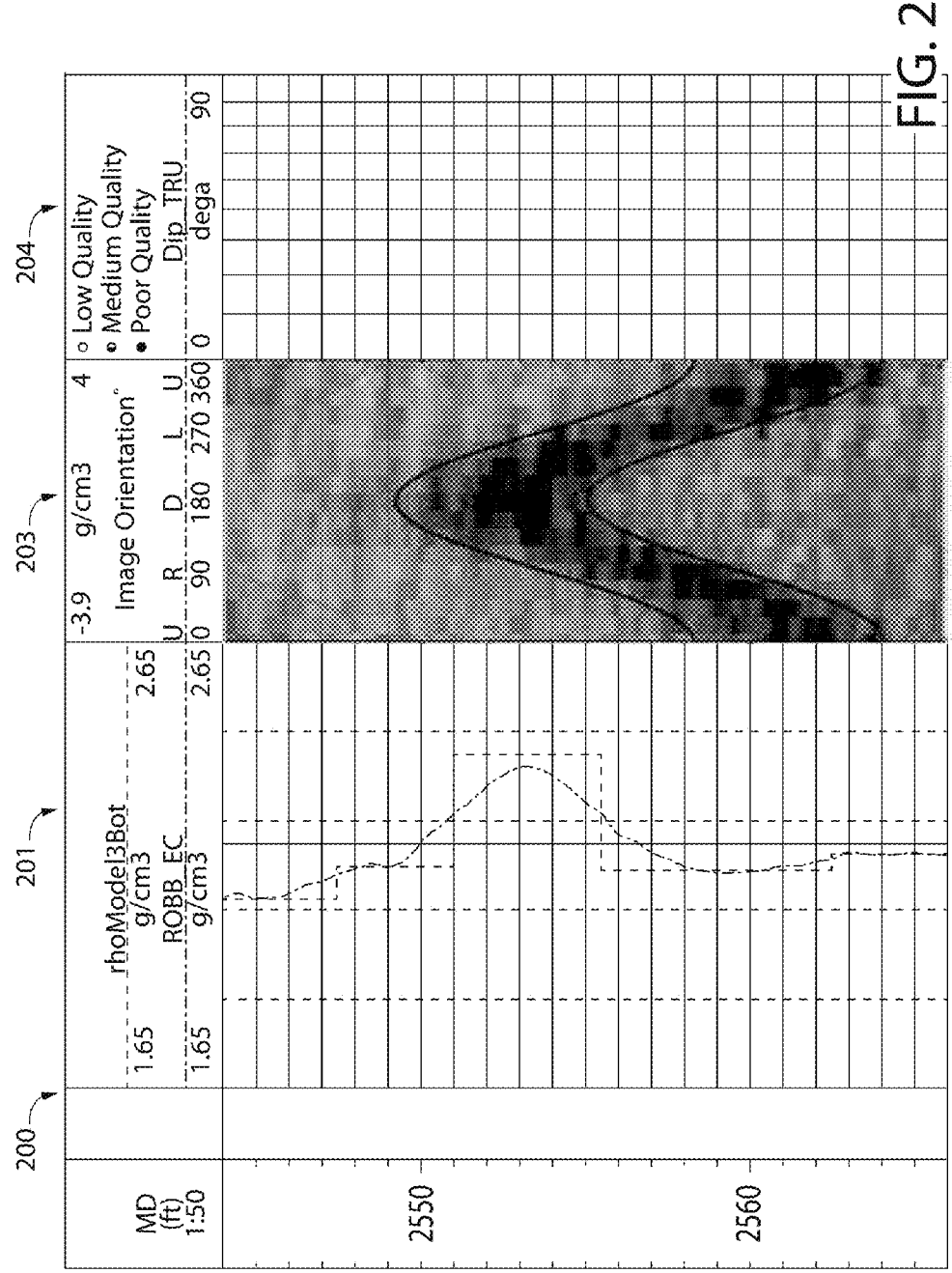
FIG. 2 depicts a well log plotted in measured depth showing the measurement and "squared" approximation of layer properties in track 1 and boundary dip in track 4, according to an embodiment.

FIG. 2 depicts a well log 200 plotted in measured depth showing the measurement and "squared" approximation of layer properties in track one 201 and boundary dip in track four 204, according to an embodiment. Track three 203 includes the azimuthal image. LWD images may be used to determine the dip or orientation of the boundaries located on the log, as shown in FIG. 2. This uses azimuthal information from the logs as well as orientation information of the trajectory. Using this information, a 1D plus dip earth volume model may be constructed.

Figure 3:
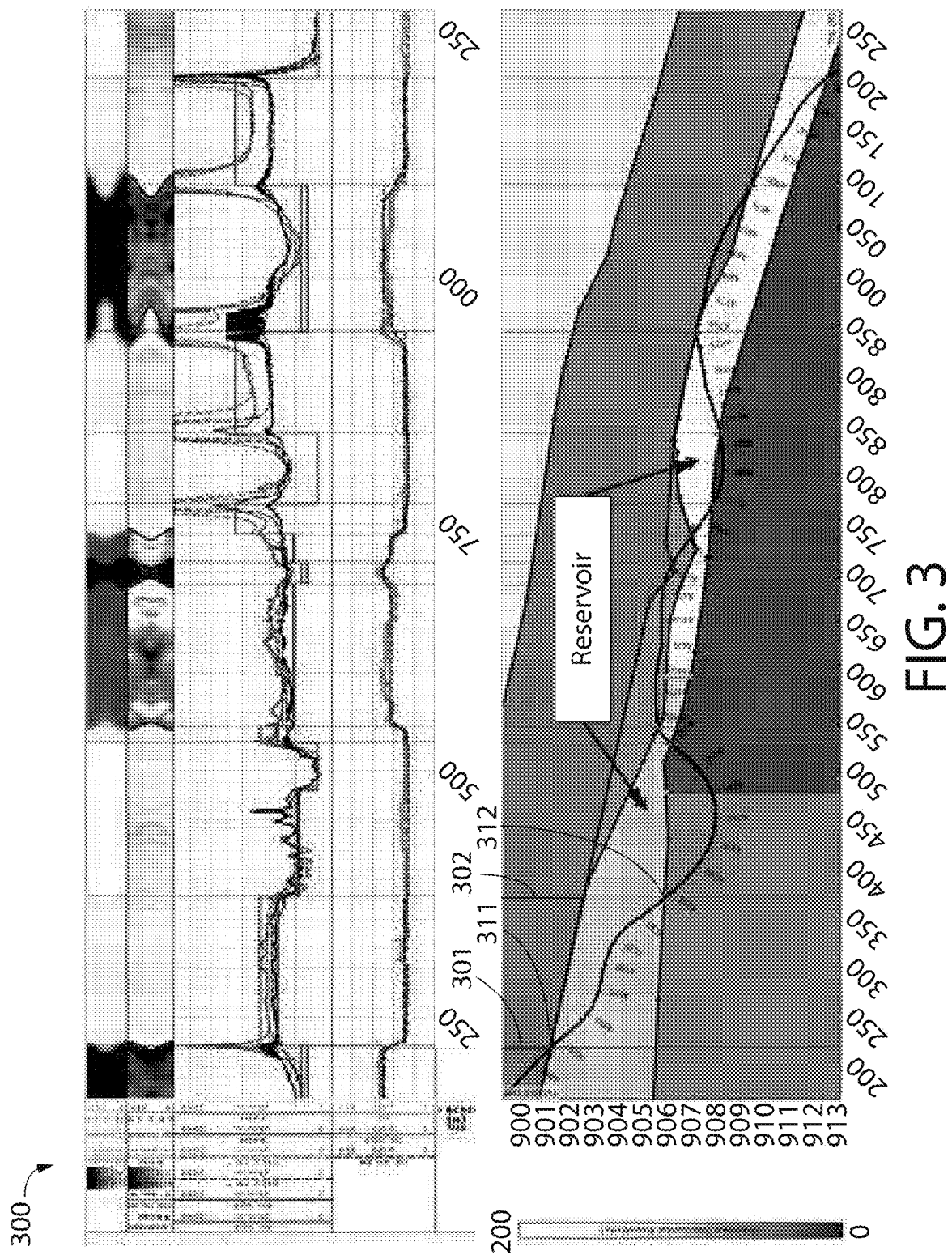
FIG. 3 depicts the workflow results of plotting the trajectory and logs on a curtain section, according to an embodiment.

FIG. 3 depicts the workflow results 300 of plotting the trajectory and logs on a curtain section, according to an embodiment. More particularly, FIG. 3 illustrates a curtain section representation of a 2D earth model, and trajectory and well logs plotted in TVD on the Y axis vs. along hole length (THL) on the X axis. These results and data can also be plotted in 3D. The trajectory is first plotted on the curtain section along with the logs along the trajectory (not shown). The logs can also be plotted in the THL log track above the curtain section. The user may first determine bed boundary crossings based on the images, logs, and sinusoids in the THL tracks. One or more inserted vertical lines (e.g., lines 301, 302) are then drawn by the computer program and intersects with the trajectory on the curtain section positioning the log derived boundary crossing onto the trajectory. These boundary crossing intersections 311, 312 with the trajectory may be used to define the layering geometry in terms of THL and TVD. Multiple crossings through the same boundary define the earth volume in 2D and 3D space depending on the lateral variation of the earth volume log properties.

The user may continue this process of sectioning the earth volume into geometrical shapes that best represent the expected geology, which can be based on knowledge taken from offset wellbores or seismic data. The user may be guided by the log data and images. For example, the boundary orientation may be given by whether the images indicate the drilling is up-section or down-section. The boundary placement and orientation may be verified by forward modeling the log measurements, as explained below.

The technique described above may be used for lower resolution measurements such as resistivity and surface and sub-surface seismic. Higher resolution measurements respond to the finer scale bedding and should have more boundaries to accurately reproduce their response using forward modeling software. A supplementary workflow is designed to accommodate these measurements. This process may be similar to the process for lower resolution measurements, except the boundaries may be detected (e.g., by the software) automatically.

Figure 4:
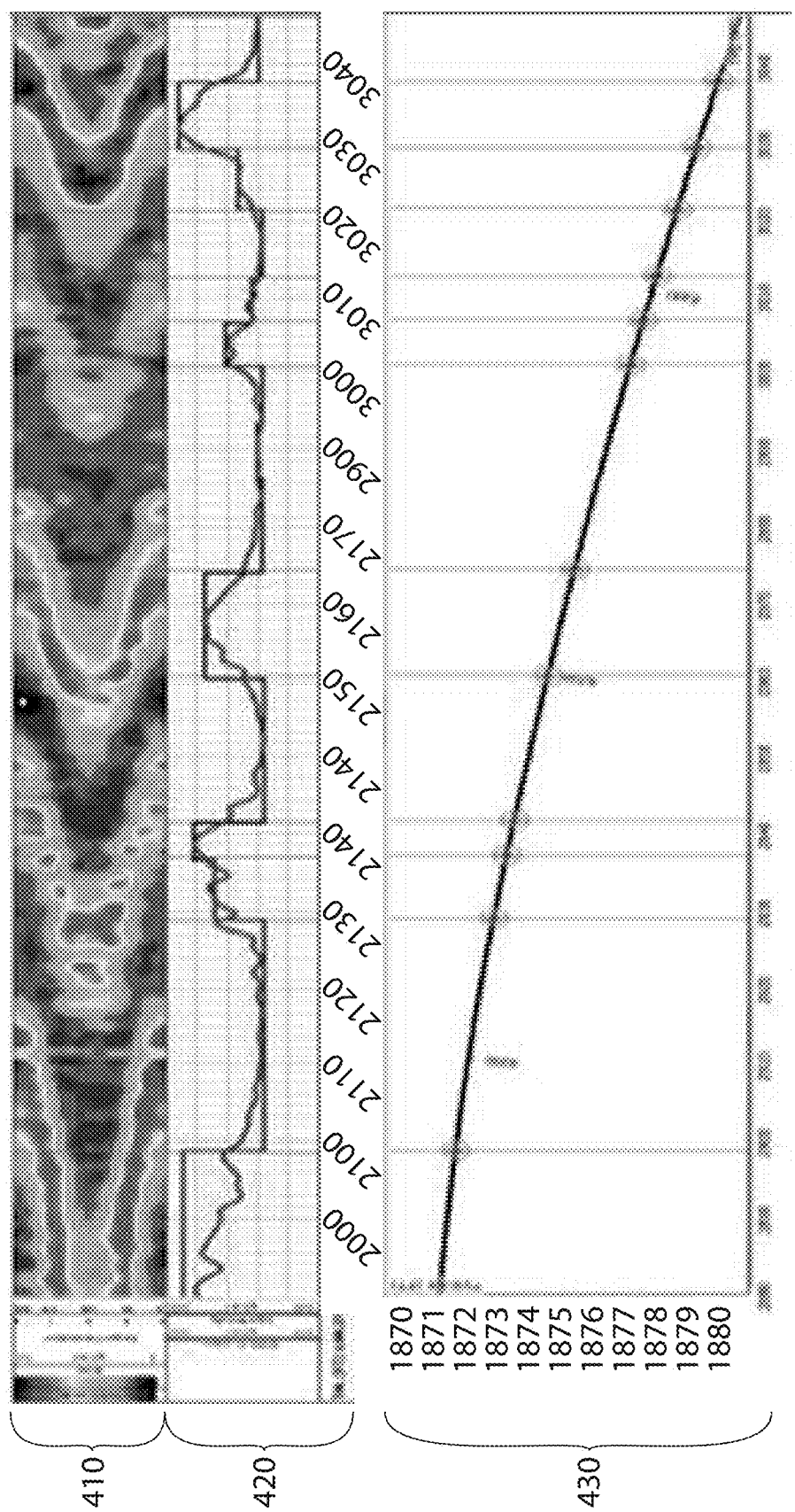
FIG. 4 depicts a density image (on the top track), and a bottom quadrant compensated density and a squared bottom quadrant density log (on the bottom track), according to an embodiment.

FIG. 4 depicts a density image 410 (on the top track), and a bottom quadrant compensated density 420 and a squared bottom quadrant density log 430 (on the bottom track), according to an embodiment. Boundaries from the squared log 430 are projected onto the trajectory centerline, as shown in the bottom panel. The dip of the boundary is then determined using an automatic image analysis method. Raw contours may then be extracted from the density image using the marching squares algorithm, as shown in the top track of FIG. 5.

Figure 5:
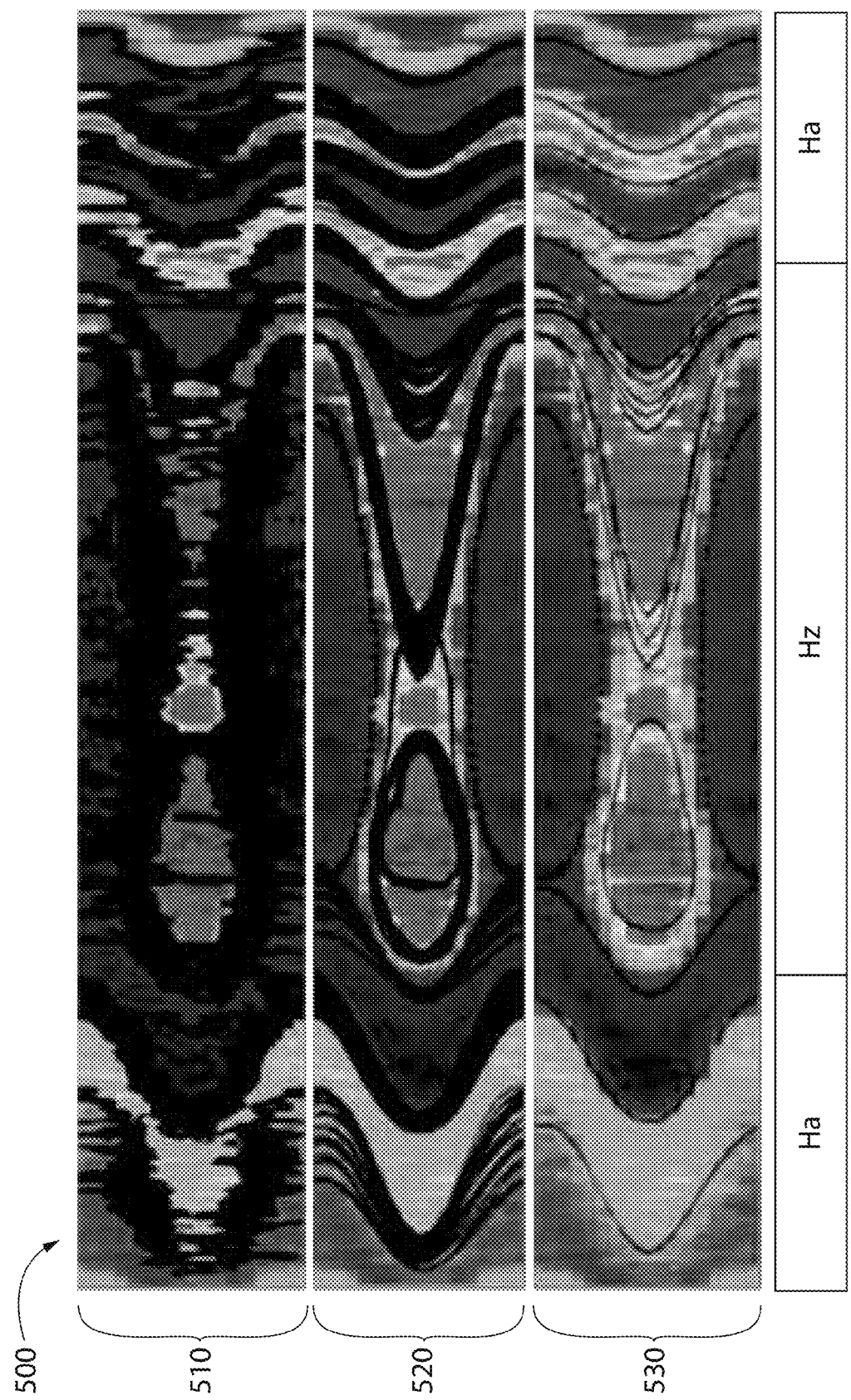
FIG. 5 depicts a density image analysis, according to an embodiment.

FIG. 5 depicts a density image analysis 500, according to an embodiment. More particularly, FIG. 5 depicts extracted raw contours 510 (on the top panel), sinusoids and ovals fit to raw contours 520 (on the middle panel), and smooth contours consolidated at boundaries 530 (on the bottom panel).

Smooth contours may be obtained by fitting the raw contours with sinusoids or ovals, as shown in the middle panel 520 of FIG. 5. At low relative dip, the contours may be fit with simple sinusoids that represent planar boundaries. At high relative dip, a boundary may be detected over several hundred feet, and a planar boundary or constant well inclination may be assumed. In this case, the contours may be fit with complex sinusoids and ovals that represent curved (non-planar) boundaries. Finally, smooth contours may be clustered around bed boundary positions that were determined by log squaring, as shown in the bottom track of FIG. 5, to derive a single contour for each boundary.

Sections along the wellbore where the smooth contours are simple sinusoids may be classified as high-angle. Sections where the contours are oval or complex sinusoids may be classified as horizontal.

Figure 6:
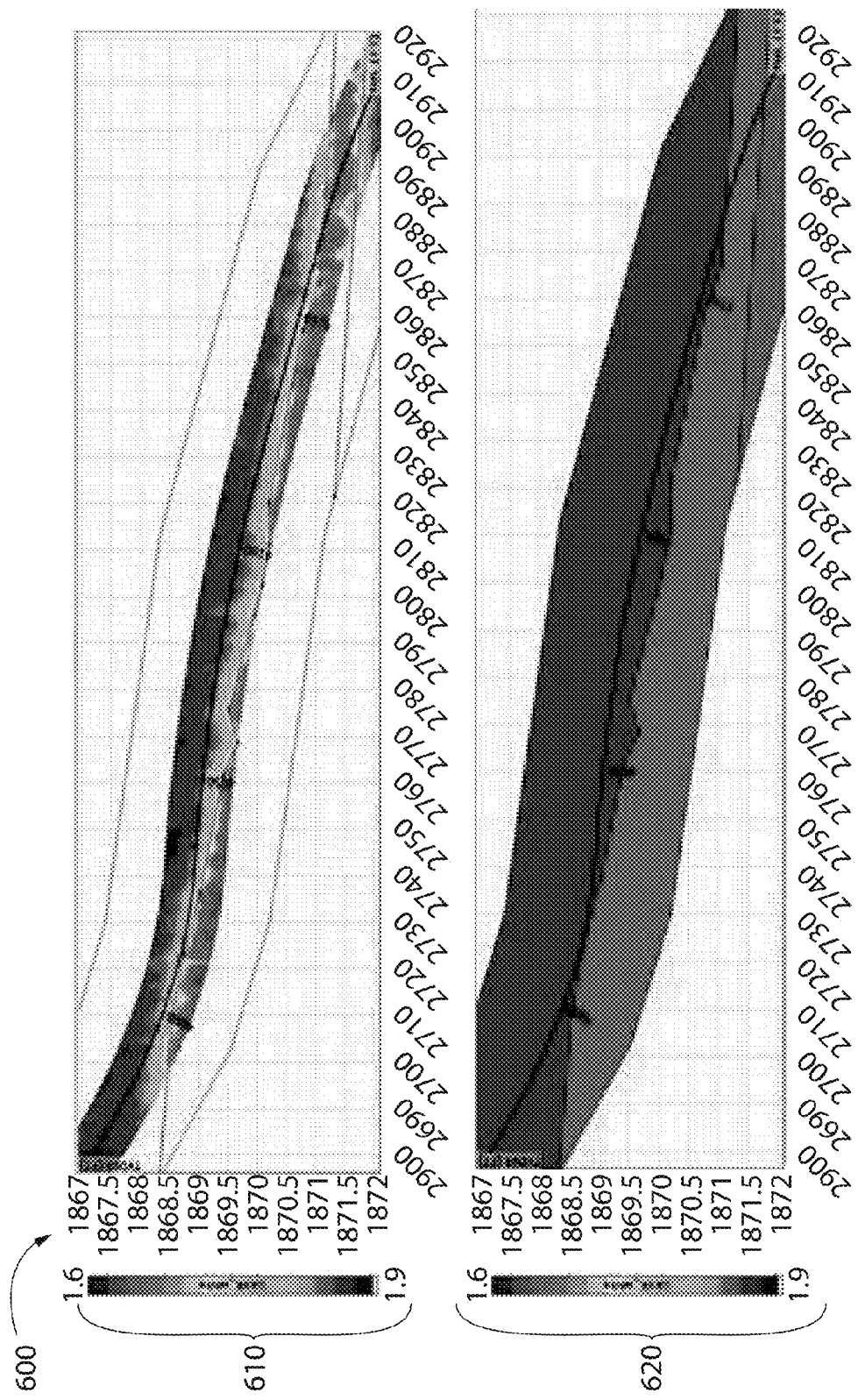
FIG. 6 depicts the layer geometry that was (e.g., automatically) determined over a high-angle section, according to an embodiment.

FIG. 6 depicts the layer geometry 600 that was (e.g., automatically) determined over a high-angle section, according to an embodiment. More particularly, FIG. 6 depicts a local layer geometry from image analysis 610 (on the top panel). For reference, a compensated density image is displayed on the trajectory. The bottom panel shows an initial density model 620 that was obtained by assigning layer densities with values obtained from the log squaring. The map indicates layer densities that were computed from the log squaring. The initial model is the starting point for automatic inversion and/or manual model-compare-update.

Figure 7:
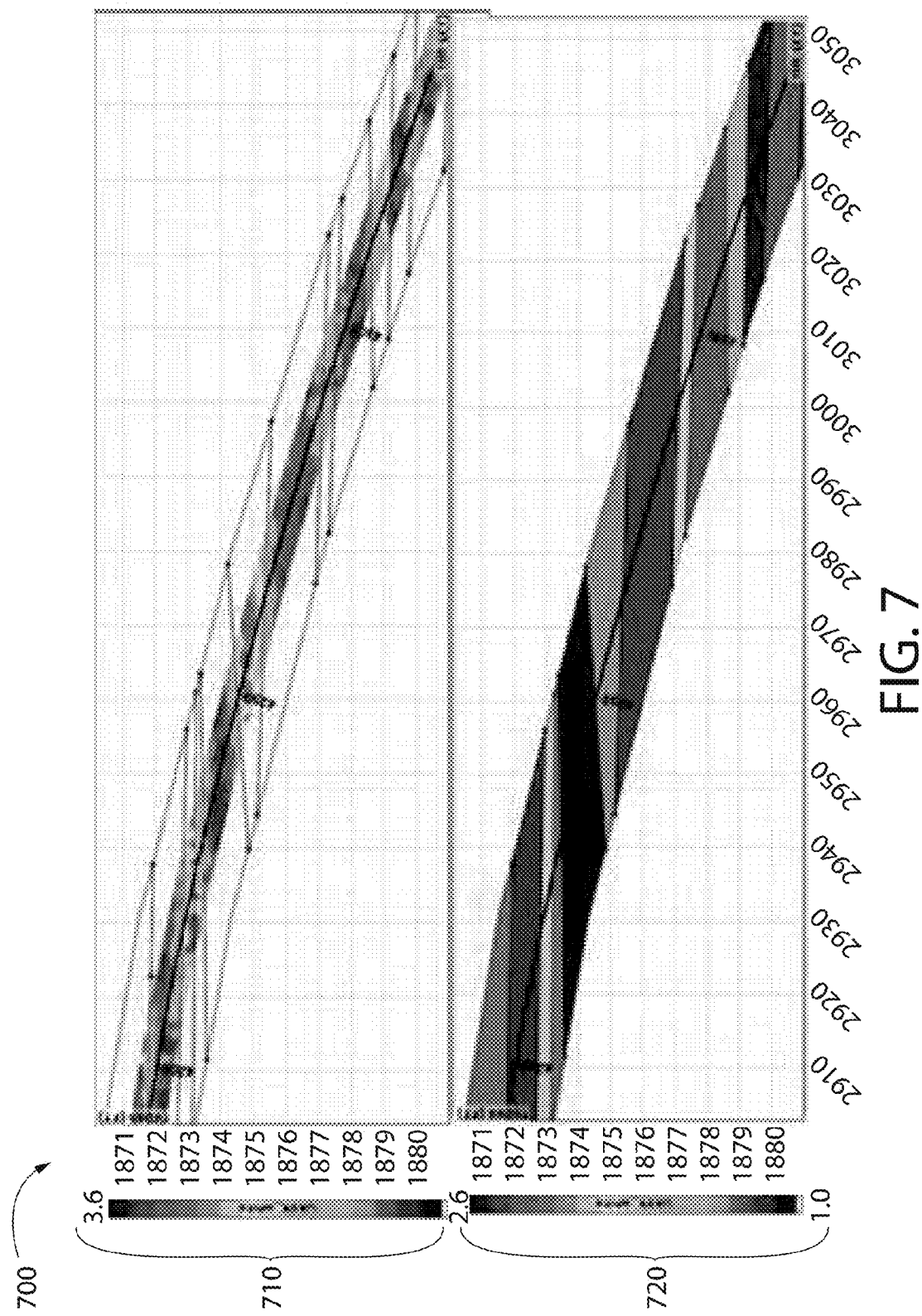
FIG. 7 depicts a layer geometry that was defined by the user over a horizontal section (on the top panel), and an initial density model (on the bottom panel), according to an embodiment.

FIG. 7 depicts a layer geometry 700 that was defined by the user over a horizontal section 710 (on the top panel), and an initial density model 720 (on the bottom panel), according to an embodiment. The boundary construction may be guided by the image displayed on the trajectory.

Next, a computation of accurate property values may be determined by inverting the measured density logs. In the high-angle sections, inversion may be based on a 1D formation model. In the horizontal sections, inversion may be based on a 2D formation model.

Figure 8:
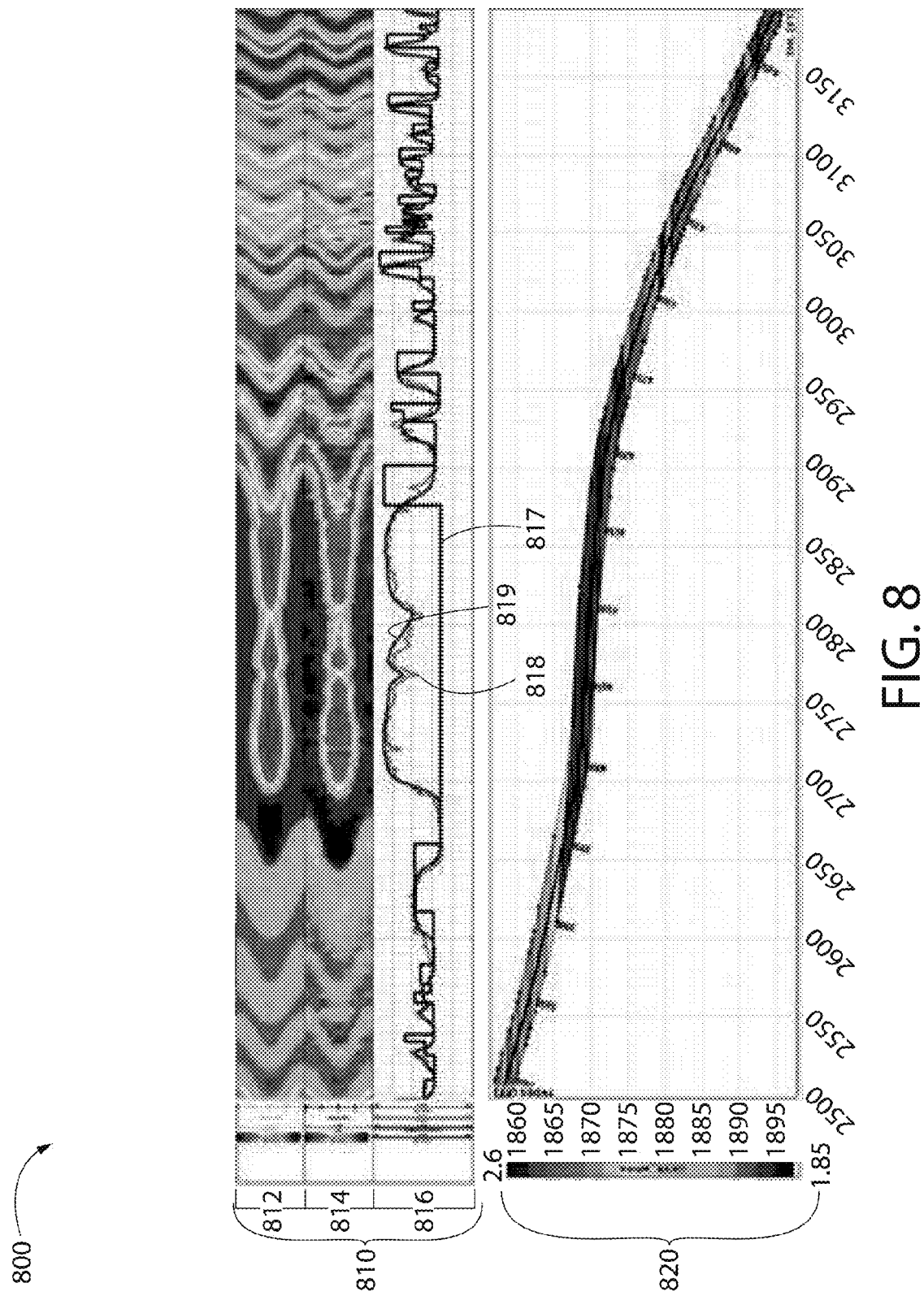
FIG. 8 depicts a local layer model for density (on the bottom panel) and measured and forward model logs (on the top panel), according to an embodiment.

FIG. 8 depicts a local layer model 800 for density 820 (on the bottom panel) and measured and forward model logs 810 (on the top panel), according to an embodiment. The layer density may be determined by inverting the measured density log. The top track 812 (in the top panel) displays the density forward model image. The middle track 814 (in the top panel) displays the measured density image. The bottom track 816 (in the top panel) displays layer density 817 and compares the measured density 818 to the forward model density 819.

The final local layer model may be displayed over the well trajectory in the bottom panel of FIG. 8. The map represents density values obtained by (e.g., automatic) inversion. The close agreement between the measured and forward model logs and images show that the local layer model is an accurate representation of the sub surface. The close agreement also validates the accuracy of the 3D density sensitivity map that is used for forward modeling and inversion. Rather than inversion, similar results can be obtained by performing a model-compare-update.

Boundary crossing locations determined by different measurements may result in location differences due to, for example, unintentional depth offsets, non-symmetrical vs. symmetrical measurement response to the boundary, measurement noise, or gradational geological transitions between layers. In the cases where one boundary location is used for each measurement, one reference location may be selected by the user (e.g., the boundary location from the density), and the boundaries determined from the other measurements may be "snapped" to this boundary. A minimum distance in TST or TVD space may be used before the boundary will be "snapped." Boundaries further than this distance may be preserved for the particular measurement. There are reasons for preserving individual boundaries for some measurements. For example, a hydrocarbon-water contact in an interval of constant porosity and shale volume may use an additional boundary for the resistivity measurement that may not be used for the gamma-ray and nuclear measurements.

Initialization of Earth Model Properties

Once the earth volume boundaries are found, the volume itself may be assigned log properties. The initialization of these properties may be determined by various techniques. The maximum, minimum, average, mean, or other averaging techniques performed on the log measurements between the boundaries of the volume may be used to compute the property of the earth volume. These values may be affected by adjacent beds. As a result, the user may cause an inversion to adjust these properties for these effects in order to remove them. Forward modeling algorithms may be used for this purpose, as explained below. The log measurements may be influenced by the earth volume within a few feet to tens of feet away from the wellbore. Therefore, the vertical extent of the earth volume in a HaHz wellbore may be limited to the DOI of the measurement used. The log property beyond this extent may be determined by a vertical variogram analysis in the property modeling process.

Earth volumes that are not crossed by the trajectory but influence the log measurement may have a log property initialized manually by the user or from the inversion. It is possible that these earth volumes have been crossed earlier or later in MD by the trajectory, and these log properties can be back or forward propagated. They may also be assigned properties based on offset wells in the vicinity of the trajectory.

Forward Modeling of Log Measurements

Forward modeling is the process of taking an earth volume and modeling the measurement response to it using a forward model which mimics the tool's measurement response to its surrounding environment, including the wellbore and formation earth volume. The forward model may accommodate a 1D, 2D, or 3D earth volume geometry.

When the forward model does not accept the earth model geometry dimensions, the earth model dimensions may be down-scaled. An example of this process is explained below. When the forward model and earth model have the same geometrical capabilities, down-scaling may be omitted, however, the earth model geometry may still be down-scaled to speed up the forward modeling process. The accuracy of these decisions may be determined and then the circumstances under which to apply them defined automatically for the user and forward modeling exercise.

To adapt a formation model to a forward modeling code, a dimension of the formation model may be approximated or downscaled to match with the dimensionality of the forward modeling code. For example, to compute a tool response at a point in a 2D curtain section model using a 1D forward modeling code, a 1D approximation of 2D model may be used.

Figure 9:
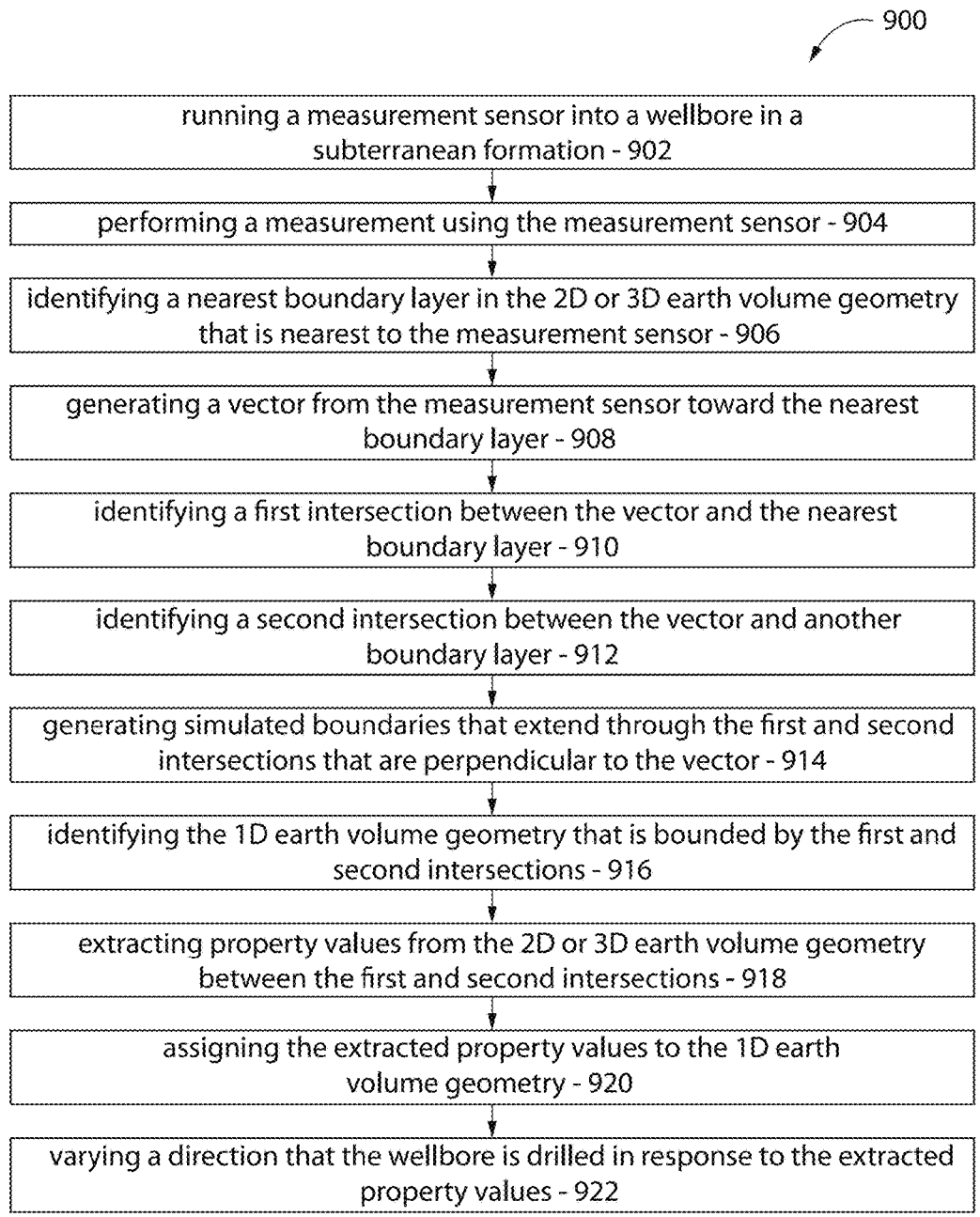
FIG. 9 depicts a flowchart of a method for transforming a two-dimensional (2D) or three-dimensional (3D) earth volume geometry into a one-dimensional (1D) approximation for forward modeling or inversion, according to an embodiment.
Figure 10:
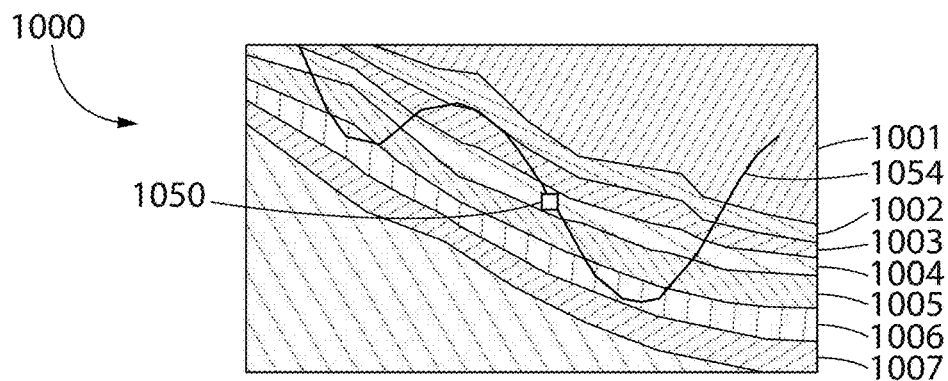
FIG. 10 depicts a measurement sensor positioned in a subterranean formation, according to an embodiment.

FIG. 9 depicts a flowchart of a method 900 for transforming a two-dimensional (2D) or three-dimensional (3D) earth volume geometry into a one-dimensional (1D) approximation for forward modeling or inversion, according to an embodiment. The method 900 may viewed together with FIGS. 10-15, which illustrate an example of an execution of the method 900. The method 900 may include positioning or running a measurement sensor in a wellbore in a subterranean formation, as at 902. FIG. 10 depicts a measurement sensor 1050 positioned in a wellbore 1054 in a subterranean formation 1000, according to an embodiment. The subterranean formation 1000 may include a plurality of layers 1001-1007, and the wellbore 1054 may extend through one or more of the layers 1001-1007. The measurement sensor 1050 may be positioned within one of the layers (e.g., layer 1004) or between two adjacent layers (not shown). The measurement sensor 1050 may be (or be part of) a MWD tool, a LWD tool, or any other type of tool configured to make a measurement in a wellbore. A forward modeling process may take place using data collected at the location of the measurement sensor 1050.

Figure 11:
FIG. 11 depicts a layer boundary that is nearest to the tool, according to an embodiment.

The method 900 may also include performing a measurement using the measurement sensor 1050, as at 904. The measurement may be any of the measurements discussed above and/or any measurement that may be performed by a LWD tool or a MWD tool. The method 900 may also include identifying a nearest layer boundary in a 2D or 3D earth volume geometry that is nearest to the measurement sensor 1050, as at 906. Fault boundaries may be excluded. As used herein, a "layer boundary" refers to the boundary between two adjacent layers (e.g., layers 1004 and 1005). The nearest layer boundary may be derived using, or consistent with, the measurement. FIG. 11 depicts a layer boundary 1014 that is nearest to the measurement sensor 1050, according to an embodiment.

Figure 12:
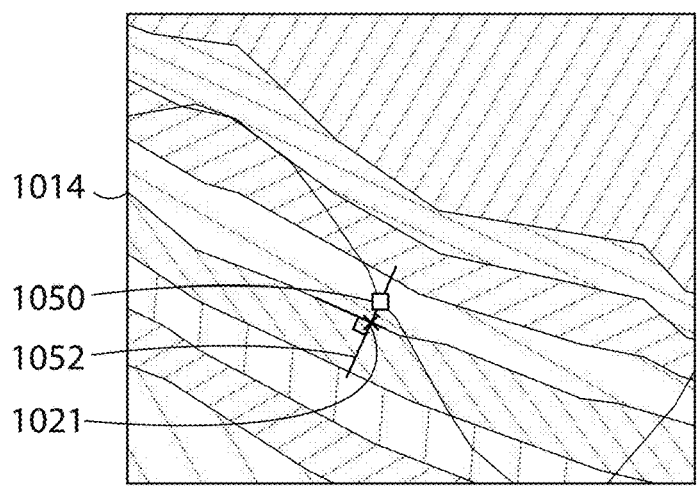
FIG. 12 depicts the tool shooting the ray to the nearest layer boundary, according to an embodiment.

The method 900 may also include generating a vector from the measurement sensor 1050 toward the nearest layer boundary 1014, as at 908. FIG. 12 depicts the measurement sensor 1050 generating a vector 1052 toward the nearest layer boundary 1014, according to an embodiment. The method 900 may then include identifying a first intersection 1021 between the vector 1052 and the nearest layer boundary 1014, as at 910. As shown, the intersection 1021 of the vector 1052 and the nearest layer boundary 1014 may be perpendicular.

Figure 13:
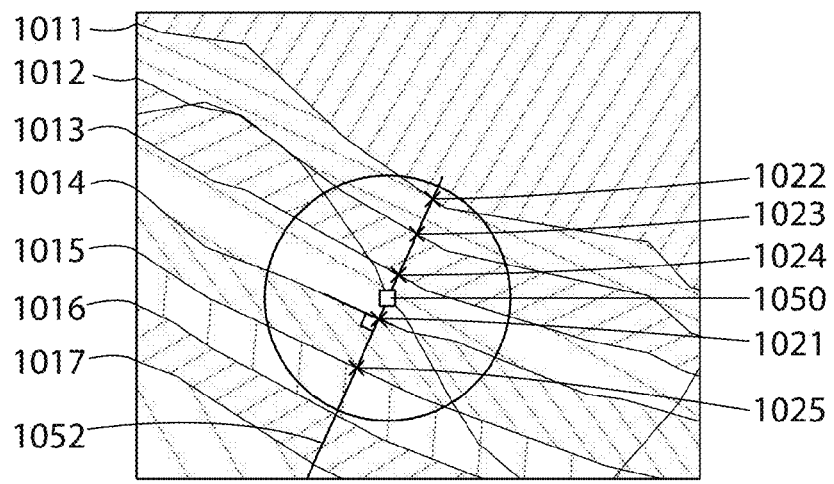
FIG. 13 depicts the intersections between the ray (and the line) and other layer boundaries, according to an embodiment.

In another embodiment, the method 900 may also or instead include identifying one or more second intersections between the vector 1052 and one or more other (i.e., not the nearest) layer boundaries, as at 912. FIG. 13 depicts the second intersections 1022-1025 between the vector 1052 and other layer boundaries 1011, 1012, 1013, 1015, according to an embodiment. The "other" layer boundaries 1011, 1012, 1013, 1015 may be within the depth of investigation (DOI), and the DOI may vary depending upon the (type of) measurement.

Figure 14:
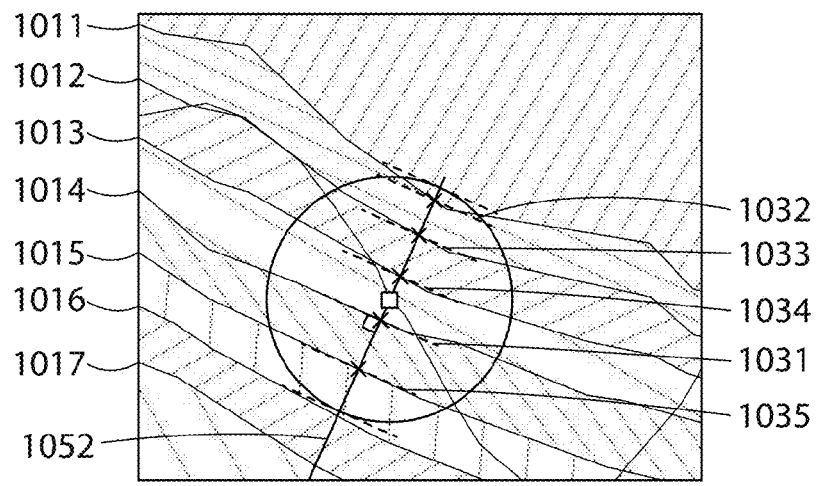
FIG. 14 depicts the a set of simulated boundaries that extend through the intersections and are perpendicular to the ray (or the line), according to an embodiment.

The method 900 may also include generating simulated boundaries that extend through the first and second intersections 1021-1025 and are perpendicular to the vector 1052, as at 914. FIG. 14 depicts the a set of simulated boundaries 1031-1035 that extend through the intersections 1021-1025 and are perpendicular to the vector 1052, according to an embodiment. The simulated boundaries 1031-1035 are shown in dashed lines. The simulated boundaries 1031-1035 may be parallel (or tangential) to and at least partially overlapping the layer boundaries 1011-1017 at the intersections 1021-1025. However, as the layer boundaries 1011-1017 may not be linear, the simulated boundaries 1031-1035 may not overlap the layer boundaries 1011-1017 along the entire length of the layer boundaries 1011-1017.

Figure 15:
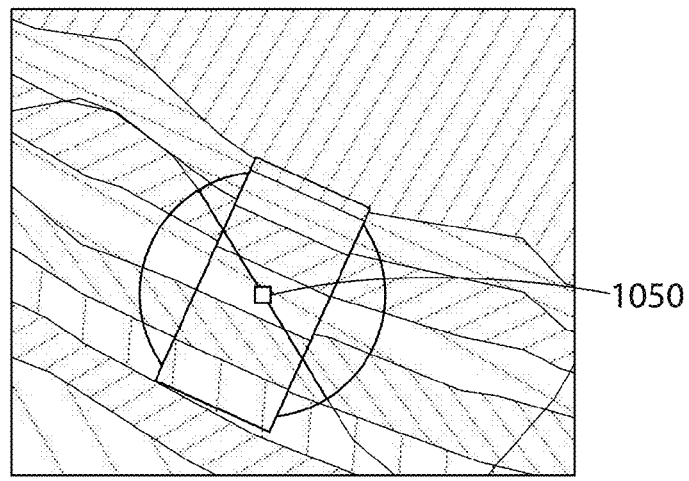
FIG. 15 depicts extracted property values from the underlying two-dimensional (2D) curtain section model being assigned to a one-dimensional (1D) layer cake model, according to an embodiment.

The method 900 may also include identifying the 1D earth volume geometry that is bounded by the first and second intersections 1021-1025, as at 916. The method 900 may also include extracting property values from the 2D or 3D earth volume geometry between the first and second intersections 1021-1025, as at 918. The method 900 may also include assigning the extracted property values to the 1D earth volume geometry (e.g., a layer cake model), as at 920. FIG. 15 depicts extracted property values from an underlying two-dimensional (2D) curtain section model being assigned to a one-dimensional (1D) layer cake model, according to an embodiment.

The method 900 may also include varying a direction that the wellbore 1054 is drilled in response to the extracted property values, as at 922. In other embodiments, instead of or in addition to varying the direction, the method 900 may include varying an amount of mud pumped into the wellbore 1054, varying a weight on a drill bit that is drilling the wellbore 1054, or the like.

The 1D model described in FIG. 6 may be passed to the 1D forward modeling process along with the relative angle between the measurement sensor 1050 and the layer boundaries 1011-1017 in the 1D model.

Once the forward model is generated, a comparison to the measured logs may be made. FIG. 3 illustrates this process and result. The THL resistivity track (third from top) has the measured logs (solid) and forward modeled logs (dashed) plotted. The earth model resistivities are represented in the curtain section view. In FIG. 3, the modeled and measured logs agree, verifying that the earth volume properties have been determined accurately. This also implies that the boundary locations and dips are also accurate since the measurement response to the earth volume also depends on these values. If the logs do not match, the user may manually change the earth volume property and re-compute the forward model. This process is defined as model-compare-update (MCU). In another embodiment, rather than the MCU process, the user may select an automatic inversion process, as explained in more detail below. The inversion also makes use of the measurement forward model. The difference is that the inversion is able to choose the change in earth volume property automatically to match the forward modeled and measured logs.

Determining Earth Model Volume Properties Using Inversion

The earth volume properties may also be determined using inversion techniques. These techniques may use the values from the initialization and model-compare-update (described above) as initial values. The inversion may then refine these properties, boundary locations, and boundary dip for each measurement used in the workflow.

Figure 16:
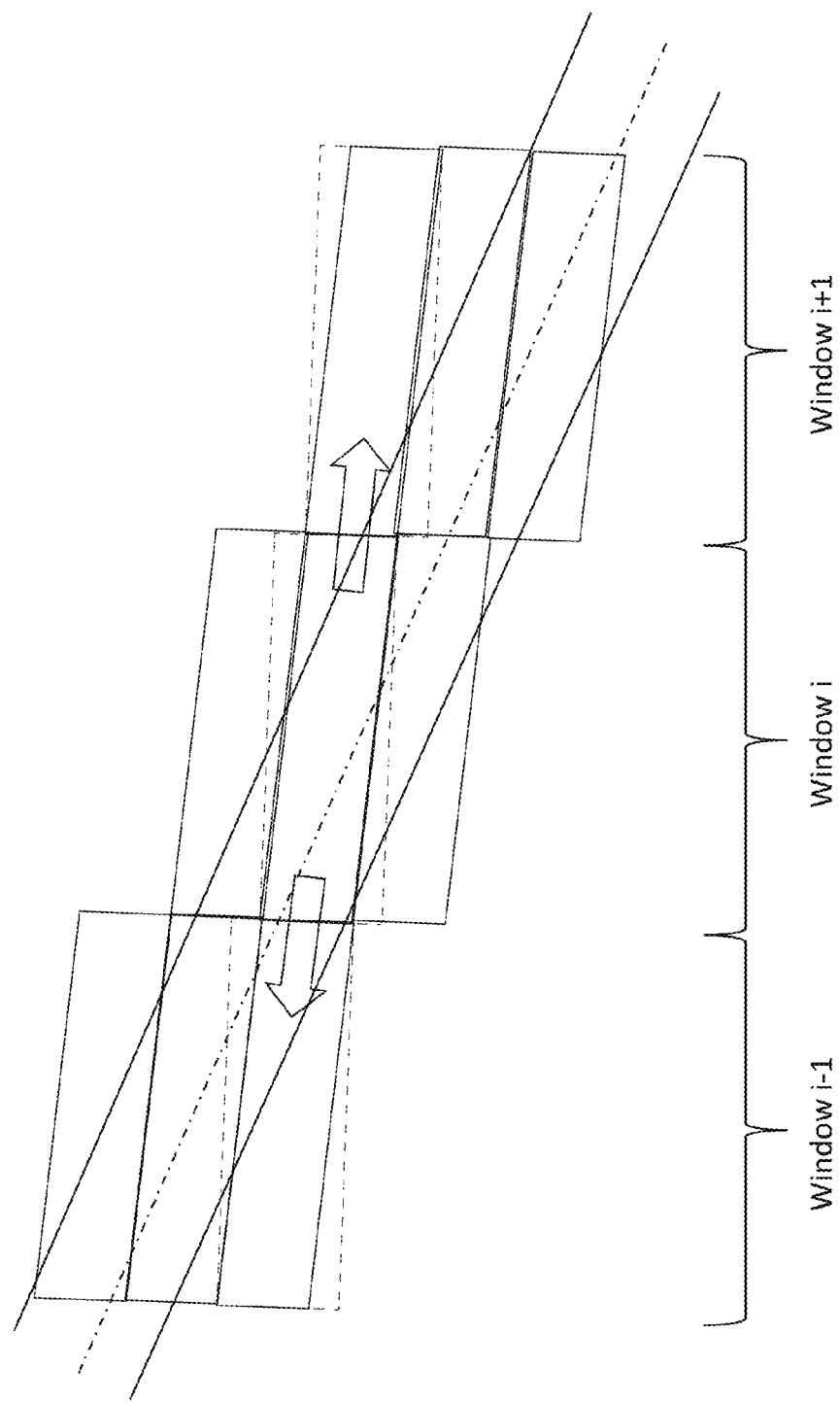
FIG. 16 depicts a sliding window concept used in the inversion, according to an embodiment.

The layer properties may be inverted based on windows. For each window, the layer property of the primary layers is kept and expanded into neighboring windows to make sure the consistency of the whole formation model. FIG. 16 depicts a sliding window concept used in the inversion, according to an embodiment. The middle layer of Window i is expanded into the corresponding layer in Window i−1 and Window i+1. This ensures that the formation model geometry that is subsequently passed to the forward modeling code has a sufficient vertical interval to encompass the measurement response that is being modeled. The subsequent forward model logs are compared to the measured logs to determine the accuracy of the inverted layer properties.

When other measurements are utilized, a multi-physics approach may be used. The density inversion produces earth volumes as thin as two inches in TST. This is possible due to the density small radial depth of investigation, the symmetrical response to bed boundaries, and the use of the azimuthally-focused bottom quadrant measurement. Other measurements, such as neutron, sigma, neutron-gamma density and resistivity, may have a non-symmetrical response to boundary crossings and are not azimuthally-focused. These measurements may be responding to several individual earth volumes identified and sensed by the more focused density measurement. Both effects depend upon the inversion including multiple earth volumes in the processing for each volume property as opposed to simply placing individual measured logs or the squared logs produced by the forward modeling exercise into the interpretation minimization solver. The workflow allows the inversion to use the curtain section volumes.

Reconciling MCU and Inversion Results

Both the manual-compare-update (MCU) using user-defined earth volume properties and forward modeling and inversion techniques may be embedded within the same program allowing both results to be displayed together. The user may select to run both techniques over the entire depth interval, run one technique over the entire depth interval, or run each technique over certain discreet depth intervals with or without overlap. The user may then compare the results. Where there are invalid results from either technique, the user may select to perform the technique again using different parameters or choose to run the other technique over the interval with invalid results. The final results may then be some combination of either one or both techniques.

Computing Derived Petrophysical Properties from Measured Properties

Once the earth volume has been assigned log properties free from the boundary crossing(s), adjacent bed effects, etc. using MCU or inversion techniques, they may now be used in a petrophysical analysis. Any petrophysical technique may be used to compute reservoir properties such as porosity, lithology, saturation and permeability, acoustic impedance, elastic moduli, etc. from these log properties. The computation may be performed in MD along the trajectory and a sample rate selected by the user which can be but may not be six inches in MD. The computation may be performed over the entire earth volume as one sample since the properties are defined as constant over the MD of the trajectory that has transected the earth volume.

Using this trajectory-centric technique, non-crossed earth volumes may not have petrophysical values computed. This issue may be solved by considering that the earth volumes have been defined in 3D, 2D, or 1D space, and therefore, the computation of petrophysical properties does not have to be performed as a function of the trajectory MD, TVD, or THL. The computation may simply be performed for each volume individually when treated as a discrete object in space.

Another technique would be to place pseudo "vertical" wells as various THL locations which would penetrate the earth volumes surrounding and intersected by the trajectory. These vertical wells may have properties as a function of TVD or MD allowing a conventional calculation of reservoir properties. Another technique is to compute the petrophysical properties within the inversion that is used to compute the log properties as described in the embedded document.

Using Reservoir Volume Petrophysical Properties in a Reservoir Model

Once the petrophysical attributes of the earth model have been computed, the values may be propagated laterally and vertically within the reservoir. The earth volumes with computed properties may have limited lateral and vertical extent due to the limited depth of investigation of the log measurements. The propagation of properties may be performed in a statistical manner using both vertical and horizontal variograms. This may use several HaHz wells within the reservoir having the above-referenced workflow performed on them. Lacking sufficient HaHz wells for property modeling, the results from the invented workflow may be used to update the reservoir model locally, and a decision on whether to change the entire layer property throughout the reservoir may be made.

Upscaling takes the property modeled values and upscales them to the scale of the grids in the reservoir simulation model. This may involves combining the properties of several distinct earth volumes into one "effect" volume.

The methods described herein may be used to perform one or more of the following, or others:

(1) determine an earth volume boundary location and orientation using measured and forward modeled log measurements in vertical and HaHz wells;

(2) reconcile earth volume boundaries determined from various log measurements having differing volumes of investigation and effective resolutions;

(3) determine log measurement properties for each specific earth volume modified for bed boundary crossings and adjacent bed effects;

(4) display and work with earth volumes in 1D, 1D plus dip, 2DV, 2DH, and 3D representations;

(5) use manual compare update forward modeling to verify earth model volume geometry and properties;

(6) downscale or simplify earth model geometry and forward modeling code geometrical dimensions to match for computational efficiency (e.g., using anisbeds 1D plus dip code for 1D layered earth model which has been downscaled from 2D or 3D earth model);

(7) workflow to use manual-compare-update methodology to verify or modify inversion results and vice-versa;

(8) define boundary positions and orientation and volume log and petrophysical properties over well sections that are bed parallel. These volumes are not crossed by the trajectory but are within the measurement volume of investigation. (the other published workflows are for Ha sections);

(9) determine earth volume petrophysical properties for each specific earth volume modified for bed boundary crossings and adjacent bed effects;

(10) compute reservoir volumetrics from earth volume properties and/or squared log inversion (e.g., ELAN by layer, and/or simultaneous inversion using earth volumes within DOI of measurements);

(11) property-model and upscale from earth model volumes and properties; and

(12) invert for layer petrophysical properties instead of log measurement properties as detailed in embedded document.

Figure 17:
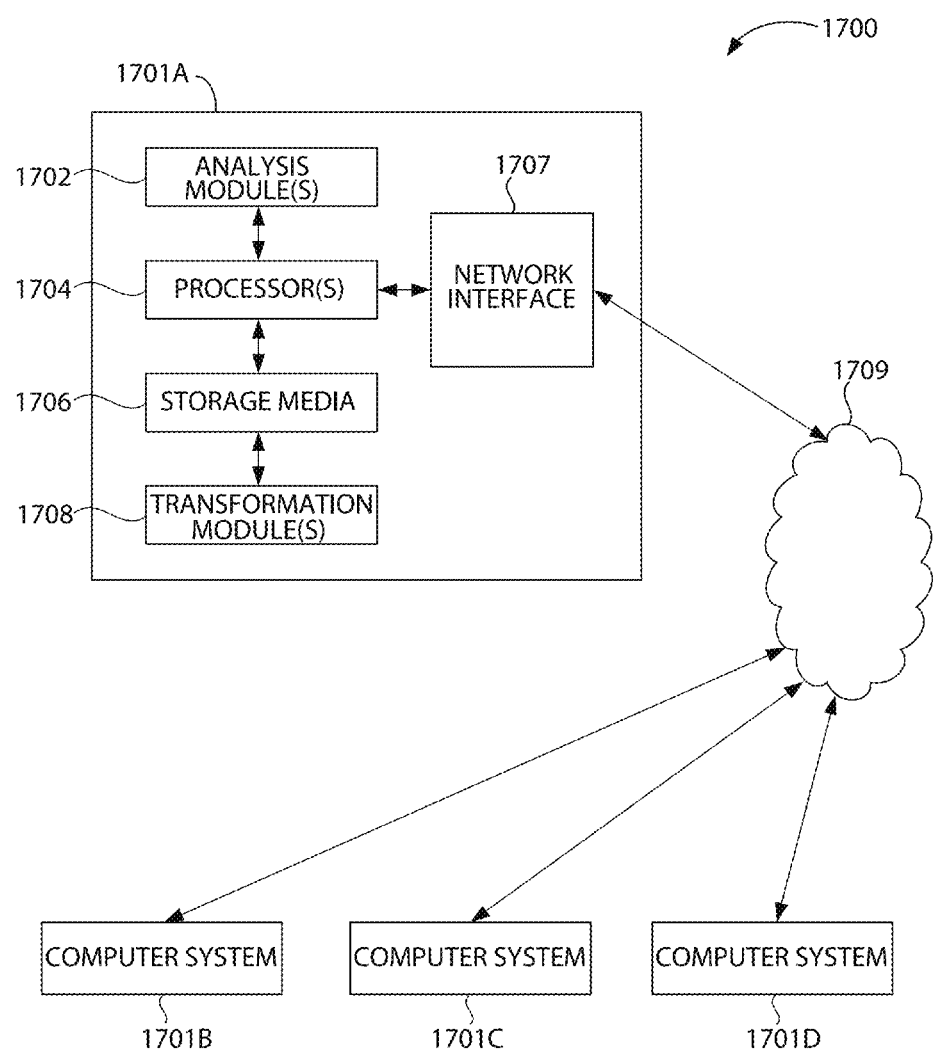
FIG. 17 depicts a schematic view of a computing system for performing at least a portion of the method, according to an embodiment.

In some embodiments, the methods of the present disclosure may be executed by a computing system. FIG. 17 illustrates an example of such a computing system 1700, in accordance with some embodiments. The computing system 1700 may include a computer or computer system 1701A, which may be an individual computer system 1701A or an arrangement of distributed computer systems. The computer system 1701A includes one or more analysis modules 1702 that are configured to perform various tasks according to some embodiments, such as one or more methods disclosed herein. To perform these various tasks, the analysis module 1702 executes independently, or in coordination with, one or more processors 1704, which is (or are) connected to one or more storage media 1706. The processor(s) 1704 is (or are) also connected to a network interface 1707 to allow the computer system 1701A to communicate over a data network 1709 with one or more additional computer systems and/or computing systems, such as 1701B, 1701C, and/or 1701D (note that computer systems 1701B, 1701C and/or 1701D may or may not share the same architecture as computer system 1701A, and may be located in different physical locations, e.g., computer systems 1701A and 1701B may be located in a processing facility, while in communication with one or more computer systems such as 1701C and/or 1701D that are located in one or more data centers, and/or located in varying countries on different continents).

A processor may include a microprocessor, microcontroller, processor module or subsystem, programmable integrated circuit, programmable gate array, or another control or computing device.

The storage media 1706 may be implemented as one or more computer-readable or machine-readable storage media. Note that while in the example embodiment of FIG. 17 storage media 1706 is depicted as within computer system 1701A, in some embodiments, storage media 1706 may be distributed within and/or across multiple internal and/or external enclosures of computing system 1701A and/or additional computing systems. Storage media 1706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or in other embodiments, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1700 contains one or more transformation module(s) 1708. The transformation module(s) 1708 may be configured transform a two-dimensional (2D) or three-dimensional (3D) earth volume geometry into a one-dimensional (1D) approximation for forward modeling or inversion, as described above.

It should be appreciated that computing system 1700 is one example of a computing system, and that computing system 1700 may have more or fewer components than shown, may combine additional components not depicted in the example embodiment of FIG. 17, and/or computing system 1700 may have a different configuration or arrangement of the components depicted in FIG. 17. The various components shown in FIG. 17 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method comprising:
    (a) deploying a measurement sensor in a subterranean wellbore drilled in the subterranean formation,
    (b) processing measurements received via the deploying to compute a 1D earth volume geometry, wherein the processing comprises:
        (i) identifying a nearest layer boundary in the 2D or 3D earth volume geometry that is nearest to the measurement sensor, wherein the nearest layer boundary is derived using, or consistent with, the measurement;
        (ii) generating a vector from the measurement sensor toward the nearest layer boundary;
        (iii) identifying a first intersection between the vector and the nearest layer boundary;
        (iv) identifying a second intersection between the vector and another layer boundary;

(v) identifying the 1D earth volume geometry that is bounded by the first and second intersections;

(vi) extracting a property value from the 2D or 3D earth volume geometry between the first and second intersections; and (vii) assigning the extracted property value to the 1D earth volume geometry; and (c) generating simulation results of flow in a reservoir by utilizing a multi-dimensional reservoir model and the 1D earth volume geometry with the assigned extracted property value.

2. The method of claim 1, wherein the extracted property value comprises the measurement or a derivative of the measurement.

3. The method of claim 1, wherein the nearest layer boundary in the 2D or 3D earth volume geometry is nearest in 3D space to the measurement sensor.

4. The method of claim 1, wherein the vector is perpendicular to the nearest layer boundary at the first intersection.

5. The method of claim 1, wherein the first intersection between the vector and the nearest layer boundary defines a relative dip of the nearest layer boundary.

6. The method of claim 1, wherein the another layer boundary is farther from the measurement sensor, in 3D space, than the nearest layer boundary.

7. The method of claim 1, further comprising modifying the extracted property value when additional layer boundaries lie beyond the nearest layer boundary but are within a depth of investigation of the measurement performed by the measurement sensor.

8. The method of claim 1, further comprising determining the extracted property value using a manual process or an inversion process to produce an inverted extracted property value.

9. The method of claim 8, further comprising defining a window for the manual process or the inversion process, wherein a length of the window is constrained to be a function of a number of parallel computing systems available, and wherein the length comprises the nearest layer boundary and one or more layers within a depth of investigation of the measurement.

10. The method of claim 8, further comprising varying a direction, a location, or both for the wellbore that is at least partially based upon the extracted property value, the inverted extracted property value, or a combination thereof.

11. The method of claim 8, further comprising determining a placement, a trajectory, or both of a second wellbore in the subterranean formation using the extracted property value, the inverted extracted property value, or a combination thereof.

12. The method of claim 8, further comprising comparing the assigned extracted property value and the determined extracted property value.

13. The method of claim 12, further comprising modifying the determined extracted property value such that a forward model of the measurement using the determined extracted property value more closely matches the measurement from the sensor.

14. The method of claim 13, further comprising:
capturing the assigned extracted property value, the determined extracted property value, or both around the wellbore as coordinates in 3D space;
aligning the coordinates with the multi-dimensional reservoir model wherein the multi-dimensional reservoir model comprises a 3D reservoir model; and
using the aligned coordinates to populate the assigned extracted property value, the determined extracted property value, or both into the 3D reservoir model along the wellbore.

15. The method of claim 14, wherein the assigned extracted property value, the determined extracted property value, or both are populated into the 3D reservoir model using upscaling or property modeling techniques.

16. A non-transitory computer-readable medium storing instructions that, when executed by at least one processor of a computing system, cause the computing system to perform operations comprising:
running a measurement sensor into a wellbore in a subterranean formation;
performing a measurement using the measurement sensor;
identifying a nearest layer boundary in the 2D or 3D earth volume geometry that is nearest to the measurement sensor, wherein the nearest layer boundary is derived using, or consistent with, the measurement;
generating a vector from the measurement sensor toward the nearest layer boundary;
identifying a first intersection between the vector and the nearest layer boundary;
identifying a second intersection between the vector and another layer boundary;
generating simulated boundaries that extend through the first and second intersections that are perpendicular to the vector;
identifying the 1D earth volume geometry that is bounded by the first and second intersections;
extracting a property value from the 2D or 3D earth volume geometry between the first and second intersections;
assigning the extracted property value to the 1D earth volume geometry; and
generating simulation results of flow in a reservoir by utilizing a multi-dimensional reservoir model and the 1D earth volume geometry with the assigned extracted property value.

17. A computing system comprising:
one or more processors; and
one or more non-transitory computer-readable media storing instructions that, when executed by at least one of the one or more processors, cause the computing system to perform operations, the operations comprising:
running a measurement sensor into a wellbore in a subterranean formation;
performing a measurement using the measurement sensor;
identifying a nearest layer boundary in the 2D or 3D earth volume geometry that is nearest to the measurement sensor, wherein the nearest layer boundary is derived using, or consistent with, the measurement;
generating a vector from the measurement sensor toward the nearest layer boundary;
identifying a first intersection between the vector and the nearest layer boundary;
identifying a second intersection between the vector and another layer boundary;
generating simulated boundaries that extend through the first and second intersections that are perpendicular to the vector;
identifying the 1D earth volume geometry that is bounded by the first and second intersections;

extracting a property value from the 2D or 3D earth volume geometry between the first and second intersections;

assigning the extracted property value to the 1D earth volume geometry; and generating simulation results of flow in a reservoir by utilizing a multi-dimensional reservoir model and the 1D earth volume geometry with the assigned extracted property value.

18. The computing system of claim 17, wherein the operations further comprise determining the extracted property value using an inversion process to produce an inverted extracted property value.

19. The computing system of claim 18, wherein the operations further comprise:

comparing the assigned extracted property value and the determined extracted property value; and modifying the determined extracted property value such that a forward model of the measurement using the determined extracted property value more closely matches the measurement from the sensor.

20. The computing system of claim 19, wherein the operations further comprise:

capturing the assigned extracted property value, the determined extracted property value, or both around the wellbore as coordinates in 3D space;

aligning the coordinates with the multi-dimensional reservoir model wherein the multi-dimensional reservoir model comprises a 3D reservoir model; and using the aligned coordinates to populate the assigned extracted property value, the determined extracted property value, or both into the 3D reservoir model along the wellbore.

* * * * *